(12) United States Patent
Stanek

(10) Patent No.: US 6,887,152 B2
(45) Date of Patent: May 3, 2005

(54) LOTTO GAME

(76) Inventor: Edward J. Stanek, 346 42$^{nd}$ St., Des Moines, IA (US) 50301

( * ) Notice: Subject to any disclaimer, the term of this patent is extended or adjusted under 35 U.S.C. 154(b) by 57 days.

(21) Appl. No.: 10/154,645

(22) Filed: May 24, 2002

(65) Prior Publication Data

US 2003/0069059 A1 Apr. 10, 2003

Related U.S. Application Data

(60) Provisional application No. 60/293,406, filed on May 24, 2001.

(51) Int. Cl.$^7$ ................................................. A63F 9/24
(52) U.S. Cl. ............................ 463/17; 273/269; 463/18
(58) Field of Search .............................. 463/17, 18, 40, 463/41, 42; 273/269, 274

(56) References Cited

U.S. PATENT DOCUMENTS

| | | | | |
|---|---|---|---|---|
| 4,842,278 A | * | 6/1989 | Markowicz | 463/18 |
| 5,186,463 A | * | 2/1993 | Marin et al. | 463/27 |
| 5,275,400 A | * | 1/1994 | Weingardt et al. | 463/12 |
| 5,613,679 A | * | 3/1997 | Casa et al. | 273/138.1 |
| 5,779,547 A | * | 7/1998 | SoRelle et al. | 463/28 |
| 5,851,149 A | * | 12/1998 | Xidos et al. | 463/42 |
| 5,909,875 A | * | 6/1999 | Weingardt | 273/269 |
| 6,017,032 A | * | 1/2000 | Grippo et al. | 273/138.1 |
| 6,024,641 A | * | 2/2000 | Sarno | 463/17 |
| 6,183,361 B1 | * | 2/2001 | Cummings et al. | 463/18 |
| 6,241,608 B1 | * | 6/2001 | Torango | 463/27 |
| 6,386,975 B1 | * | 5/2002 | Peterson | 463/16 |
| 6,425,823 B1 | * | 7/2002 | Byrne | 463/16 |
| 2002/0042297 A1 | * | 4/2002 | Torango | 463/27 |

* cited by examiner

Primary Examiner—Jessica J. Harrison
(74) Attorney, Agent, or Firm—Faegre & Benson LLP

(57) ABSTRACT

A lotto game having a jackpot prize level and at least one subordinate prize level and which is played simultaneously in a plurality of jurisdictions or countries. A fixed amount from each ticket sold in all partner countries/jurisdictions is accumulated in a super prize pool that is split by winners in more than one prize level. The amount of the jackpot prize, the subordinate prizes, and the ticket prices can be different in each participating jurisdiction. These prizes are made pari-mutuel and are gauged relative to a fictional or reference currency. A determination made of each prize level for each jurisdiction as per the rules set by that jurisdiction is made in the reference currency, adjustments are made to normalize the prize back to a local currency, and prizes are awarded on a pari-mutuel basis for each prize level.

9 Claims, 5 Drawing Sheets

LOTTO GAME

This application claims priority to U.S. Provisional Application, Ser. No. 60/293,406, filed May 24, 2001.

BACKGROUND OF THE INVENTION

1. Field of the Invention

The invention relates generally to lottery games and, more specifically, to lotto games that are adapted to be played in a number of political jurisdictions which may have different currencies and lottery pay-out rules.

2. Background of the Prior Art

Many different types of lottery games have been sold over the course of history in various jurisdictions. The "traditional" game has been sold for several hundred years. This game is based on the concept of a raffle. Generally, tickets are sold with unique numbers. The drawing mechanism is developed, often using balls, sometimes thousands of them, each with a unique number corresponding to a ticket. Other times individual digits for winning numbers are drawn from a series of machines. The drawings are held so that a large prize and subordinate prizes are paid according to the unique numbers drawn and delegated to a particular prize level. Sometimes subordinate prizes are paid for matching part but not all of the numbers as long as the digits being matched are a subset of the digits on the balls drawn in exact order.

Instant lottery tickets, also called scratch tickets, were invented in the second half of the 20th century. They utilize a secure printing medium with numbers or symbols covered by latex or some other material. The covering is scratched and players win prizes by adding up, lining up, or matching covered symbols. Various patents have been issued relative to the substrate, security precautions, symbol coverings, and play styles for these types of games. They now account for roughly half of lottery sales in North America.

Another type of lottery ticket is the pull-tab ticket. It utilizes layers of cardboard glued together, with one layer having a series of perforations to form tabs. As the tabs are pulled away from the ticket they reveal symbols underneath and matching various combinations of symbols leads to the winning of prizes.

The last category of lottery type games are generally referred to as lotto games and are based on the concept of picking numbers. These games usually involve players picking their own numbers or using a computer or some other mechanism to chose the numbers, in an attempt to match the numbers against those drawn by the lottery. The lotto concept was originally developed in Italy about 1580. It evolved from bets being placed on which candidates were chosen at random to serve in the senate. The betting was so popular among the citizenry that the incidence of the drawings was increased and the names of senators changed to numbers.

One of the most successful lotto type games in modern times is commonly known as pick 3. Players choose three digits from zero to nine. The lottery chooses three digits from zero to nine. If the player's numbers match the lottery's numbers in exact order, a top prize is won. Other betting variations can be made where a player chooses to match the two front digits, the two back digits, the first and last digit, or some combination of the above. The game was typically run manually and illegally by crime networks for generations in large cities in the United States. State lotteries began to offer the game and computerized it so that it could be played efficiently on daily basis. A similar game has been developed for matching four digits.

Another typical lotto game in the United States and much of the rest of the world involves establishing a field of numbers from one to X. A player chooses, say, six of these numbers. The lottery then draws six numbers and a top prize is won if all numbers match in any order. The odds of winning the top prize can be altered by making X a larger number. In doing so there will be fewer winners of the top prize, which allows lottery sellers to offer a large jackpot prize. The prize can further be enhanced if no winner is chosen in a particular drawing. The lottery is then able to bank part or all of the non-won prize money from a previous drawing and offer it as an incentive for sales in a subsequent drawing, by increasing the size of the jackpot. In typical lotto games of this nature, subordinate prizes are also awarded for the matching of five, four, or even three of the six numbers drawn in any order. A typical prize structure for a pick 6 out of 30 game is to pay the jackpot prize if all 6 matches are correct, the approximate average odds of which are 1:593,775; pay $100 if there are 5 matches, the approximate average odds of which are 1:4,124; pay $10 if there are 4 matches, the approximate average odds of which are 1:144; and provide a free play if there are 3 matches, the approximate average odds of which are 1:15. Of course, the allocation of prize money to be divided is subject to selection or design for each ticket sold.

Keno is a lottery game in which the house draws a number of balls, say, from a group or field of balls that is larger than the number of balls selected by a player, but any match between the balls selected by the player to the balls drawn by the house counts. Lotto games are actually a subset of keno games; in lotto games, the number of balls drawn by the house or lottery equals the number of balls picked by the player.

In contrast, higher prizes can be offered by establishing a matrix of different size. If a game is chosen where the goal is to match 6 of 49, then a typical prize structure may be to pay out $2,000,000 if there are 6 matches, having an approximate average number of prizes for each drawing of less than one; $65,816.40 if there are 5 matches and a match with a bonus number, having an approximate average numbers of prizes for each drawing of 8; $1,784.80 if there are 5 matches, having an approximate average numbers of prizes for each drawing of 236; $68.10 if there are 4 matches, having an approximate average numbers of prizes for each drawing of 11,857; and $10 if there are 3 matches, having an approximate average numbers of prizes for each drawing of 213,760. A variation of this game with smaller top prizes but better odds is a pick 5 game, a game involving matching five numbers by the player's choice in the drawing in any order. There is also a variation with seven numbers.

Another variation on this concept has emerged in the last decade, typically called "rolldown" in the United States. In a rolldown lotto game everything proceeds as in a typical pick six or pick five lotto game, as above, except that in the event that there is no jackpot winner, prize money that has not been won is allocated to smaller prizes rather than being banked to enhance subsequent jackpots. Therefore the lack of a jackpot winner provides money to enhance the size of the prizes for lower tier winners. A typical prize structure and relative occurrences for a pick 5 out of 55 rolldown game may be to pay the jackpot if all 5 numbers are matched, the probability of which is 1:3,478,761; pay $500 if 4 numbers are matched, the probability of which is 1:13,915; pay $10 if 3 numbers are matched, the probability of which is 1:284; and pay $1 if 2 numbers are matched, the probability of which is 1:18.

In some instances a bonus ball can be added to a lotto game to create a prize smaller than the jackpot prize but larger than any of the other prizes. So, for instance, in a pick six lotto game a player matches only five of the six numbers drawn by the lottery; however, the lottery has also drawn a seventh ball, the bonus ball, which if paired with any five of the six other numbers drawn by the lottery creates a prize intermediate between matching five and matching the six original balls drawn.

In the last decade a new high jackpot game was developed called Powerball® (Multi-State Lottery Association, West Des Moines, Iowa). It was emulated by the Big Game in the United States (now Mega Millions), by Powerball in Australia, and similar games introduced in other countries. Unlike lotto, where the player picks six balls from one to N drawn by the lottery, the player instead chooses five numbers from one to X, and one number from one to Y. The lottery then draws five numbers from one to X and one number from one to Y from separate drawing machines and prizes are awarded according to various matches. The Powerball® lottery game is a combination of two lotto games in one. Both games must be won to win the jackpot prize. It is also designed so that any player matching the single ball drawn from the one to Y device wins a prize. The concept has been extraordinarily successful. Table 1 lays out a prize structure applicable to a typical Powerball® lottery game.

TABLE 1

Prize Structure for a Double Lottery (5/49 + 1/42) Game - One Play for $1

|  | Odds | Number of Winners | Prize Levels | Prize Cost | Prize % of Sales |
|---|---|---|---|---|---|
| Match 5 + 1 | 80,089,128.00 | 1 | $46,762,840 | 23,381,420 | 29.1942 |
| Match 5 + 0 | 1,953,393.37 | 41 | 100,000 | 4,100,00 | 5.1193 |
| Match 4 + 1 | 364,041.49 | 220 | 5,000 | 1,100,000 | 1.3735 |
| Match 4 + 0 | 8,879.06 | 9,020 | 100 | 902,000 | 1.1262 |
| Match 3 + 1 | 8,466.08 | 9,460 | 100 | 946,000 | 1.1812 |
| Match 3 + 0 | 206.49 | 387,860 | 7 | 2,715,020 | 3.3900 |
| Match 2 + 1 | 604.72 | 132,440 | 7 | 927,080 | 1.1576 |
| Match 2 + 0 | 14.75 | 5,430,040 |  | 0 | 0.000 |
| Match 1 + 1 | 117.99 | 678,755 | 4 | 2,715,020 | 3.3900 |
| Match 1 + 0 | 2.878 | 27,828,955 |  | 0 | 0.0000 |
| Match 0 + 1 | 73.75 | 1,086,008 | 3 | 3,258,024 | 4.0680 |
| Match 0 + 0 | 180 | 44,526,328 |  | 0 | 0.0000 |
| Totals | 1.00 | 80,089,128 |  | 40,044,564 | 50.0000 |
| Overall Odds: | 34.76 | 2,303805 |  |  |  |

Although the player is still only picking six numbers, drawing them from two separate fields can greatly increase the odds of matching all numbers correctly while maintaining relatively good odds of low level matches. The number of different intermediate prize levels that can also be offered is greater than that available for a pick six lotto game because there are more possible combinations of matches that can be made by the two separate fields and two drawing mechanisms. For instance, in a pick six game the only possibilities of matches are to ultimately guess six, five, four, three, two, one and zero numbers; a total of seven choices. Therefore only seven prize levels can be offered. However, with the concept of the Powerball® lottery game, there are eleven possible matches.

Because the odds of winning the Powerball® lottery game are so high (i.e., 80 million to one) the generation of frequent wins to amass cash substantial enough to keep players' interest requires a sizable audience of lottery customers. Therefore games with odds of this magnitude are particularly suited for multi-jurisdictional lotto games. The combined population makes the game possible. A certain fraction of each ticket sold is pooled by each of the participating partners for purposes of establishing a jackpot prize pool. The size of the top prize and the odds of winning it go hand in hand. The ability to make the game dynamic depends on per capita spending over a large player base. However, as time progresses lottery players can become jaded to the size of the prize so the matrix must be changed to make the odds of winning a jackpot stiffer, sacrificing the frequency of jackpot winners. In other words, fewer but larger jackpots are won over the course of time. With a fixed population base eventually the number of jackpot winners may decline to the point where players may lose interest. Clearly the size of the jackpot is important in the United States, as has been demonstrated by United States lotteries. After achieving a new record jackpot, sales for lower jackpots generally are reduced, a phenomenon known in the industry as "jackpot fatigue." For example, the Powerball® lottery game must now achieve a jackpot of $50 million to have the same sales that once occurred for a jackpot of $20 million.

So there exists a dilemma. Expanding the odds to increase the size of the jackpot works in the short term but causes players to become jaded and sales to decline over time. Meanwhile, raising the odds further reduces the number of jackpot winners as jackpot fatigue sets in and players lose interest in infrequent jackpots and sales decline. The solution is to expand the player population base while expanding the size of the matrix and increasing the odds for the top prize. Doing so increases jackpot size without adversely affecting frequency of wins. Doing so also has certain limitations, usually characterized by political boundaries. The multi-jurisdictional Powerball® lottery game has achieved its success by assimilating the cooperation of multiple United States jurisdictions. All of these jurisdictions operate under a common national flag with a common language and a common currency. For political reasons expansion appears to be limited within the United States and therefore it is desirable to partner with lotteries outside of United States borders. However, the expectations of players outside the United States, the regulatory systems under which they operate, and limitations on the size of jackpot prizes pose an impediment to this matrix expansion. Furthermore, currency differences suggest that the size of prizes based on a fixed prize pool can vary from day to day from one jurisdiction to another, depending on the foreign exchange rates for the currencies in respective countries. Therefore, the challenge is to find a way to accommodate jackpot limitations, regulatory systems, and currency differences in such a way as to offer a game with enhanced value compared to existing games in all jurisdictions.

SUMMARY OF THE INVENTION

The present invention is a lotto game that is played in a plurality of lottery jurisdictions or countries which may have different currencies and different ticket prices, and which may have a variety of rules regarding the size and payment of prizes. A game where the odds of winning a jackpot prize are the same for each participating lottery is adopted. Subordinate prize structures can vary from lottery to lottery. The lotteries sell tickets to customers in each of the countries or jurisdictions that collaborate to administer the game. A fixed amount of money in a standard or reference currency is allocated to a common pool (called the "Super Pool" in this specification) for each chance sold. Each lottery then sells its chances. After the drawing, if there is no jackpot winner, the subordinate prize winners in each jurisdiction or country receive their proportionate amount for each prize level as determined by the lottery selling the ticket. The Super Pool consists of prize finds not awarded since the last jackpot was won. The Super Pool will increase until there is a jackpot winner in at least one of the jurisdictions or countries or until a ceiling is reached for the jackpot prize as determined by that jurisdiction or country. When one or more jackpot winners are identified, the amount in the Super Pool is shared evenly among the countries of the jackpot winner(s). Subordinate prize winners in countries without jackpot winners are paid as for all other drawings where there was not a jackpot winner. In countries where there is a jackpot winner, the prize is paid to the winner(s) up to the jackpot limit set by that country, and any remaining money in the Super Pool is used to supplement subordinate prizes in that country or lottery according to a formula determined by that country or lottery.

An object of the present invention is to provide a lotto game that is suitable for play in a plurality of countries with different currencies or a plurality of lotteries which choose to offer varying rules for winning non-jackpot lotto prizes.

Another object of the present invention is to provide a lotto game that is suitable for play among lottery jurisdictions or countries that have rules on the size and allocation of prizes that are different from those rules in other jurisdictions or countries that also participate in the game.

Another object of the present invention is to allow varying prices for chances sold in a single game among various jurisdictions.

A further object of the present invention is to provide a lotto game that has a population base larger than is available if the game was limited to only a single country.

These and other objects of the invention will be appreciated by those skilled in the art upon a review and understanding of this specification and the appended claims.

DETAILED DESCRIPTION OF A PREFERRED EMBODIMENT

Multi-jurisdictional lotto games have ventured beyond international borders, as exemplified by a game called Viking Lotto offered in Scandinavia. For all jackpot related lotto games to date, the pooled prize money relates solely to the jackpot level. Therefore, a new game design is hereby proposed which would pool a fixed amount from each ticket sold in all partner countries/jurisdictions to a super prize pool (referred to herein as the "Super Pool") that will be split by some winners in more than one prize level. Furthermore, the amount of the jackpot prize and the subordinate prizes can be different in each participating jurisdiction. These subordinate prizes may be made pari-mutuel and are gauged relative to a referenced currency. A determination made of each prize level for each jurisdiction as per the rules set by that jurisdiction is made in the referenced currency, adjustments are made to normalize the prize back to a local currency, and prizes are awarded on a pari-mutuel basis for each prize level.

Figure 1:
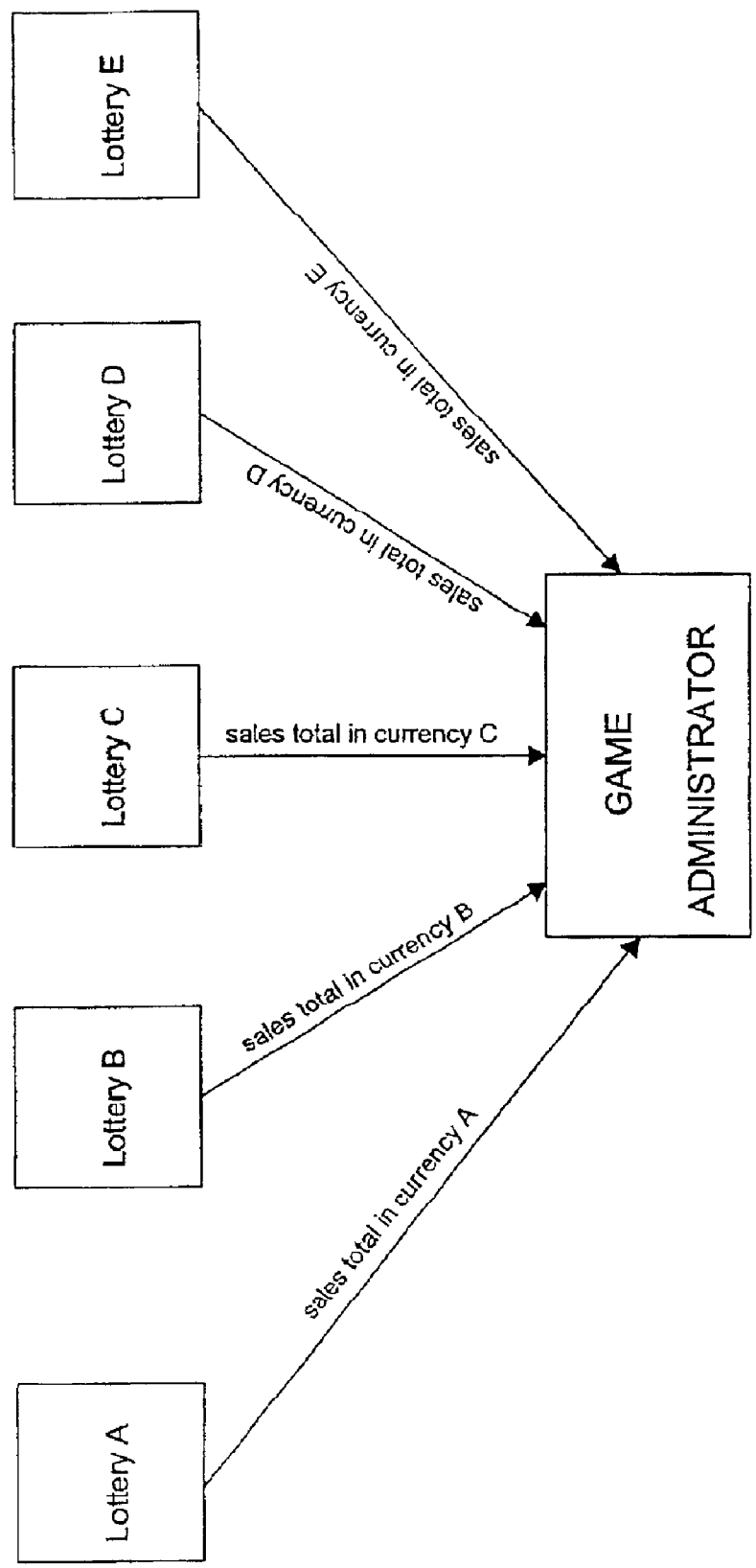
FIG. 1 is a diagram of the reporting of ticket sales in each of five jurisdictions in their own currencies to the game administrator at the close of sales for a particular drawing.
Figure 2:
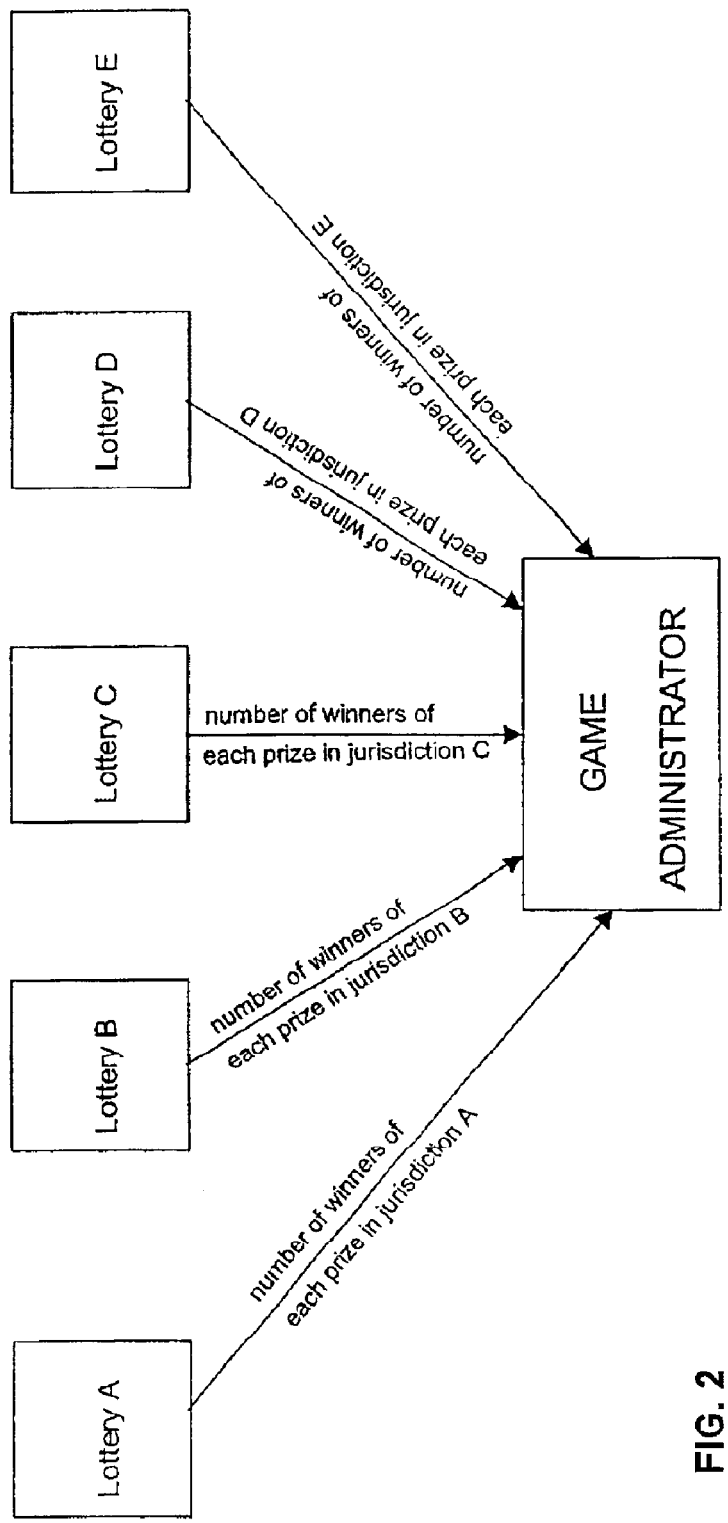
FIG. 2 is a diagram of the reporting of the number of winners at each prize level in each jurisdiction of FIG. 1 to the game administrator after the drawing.
Figure 3:
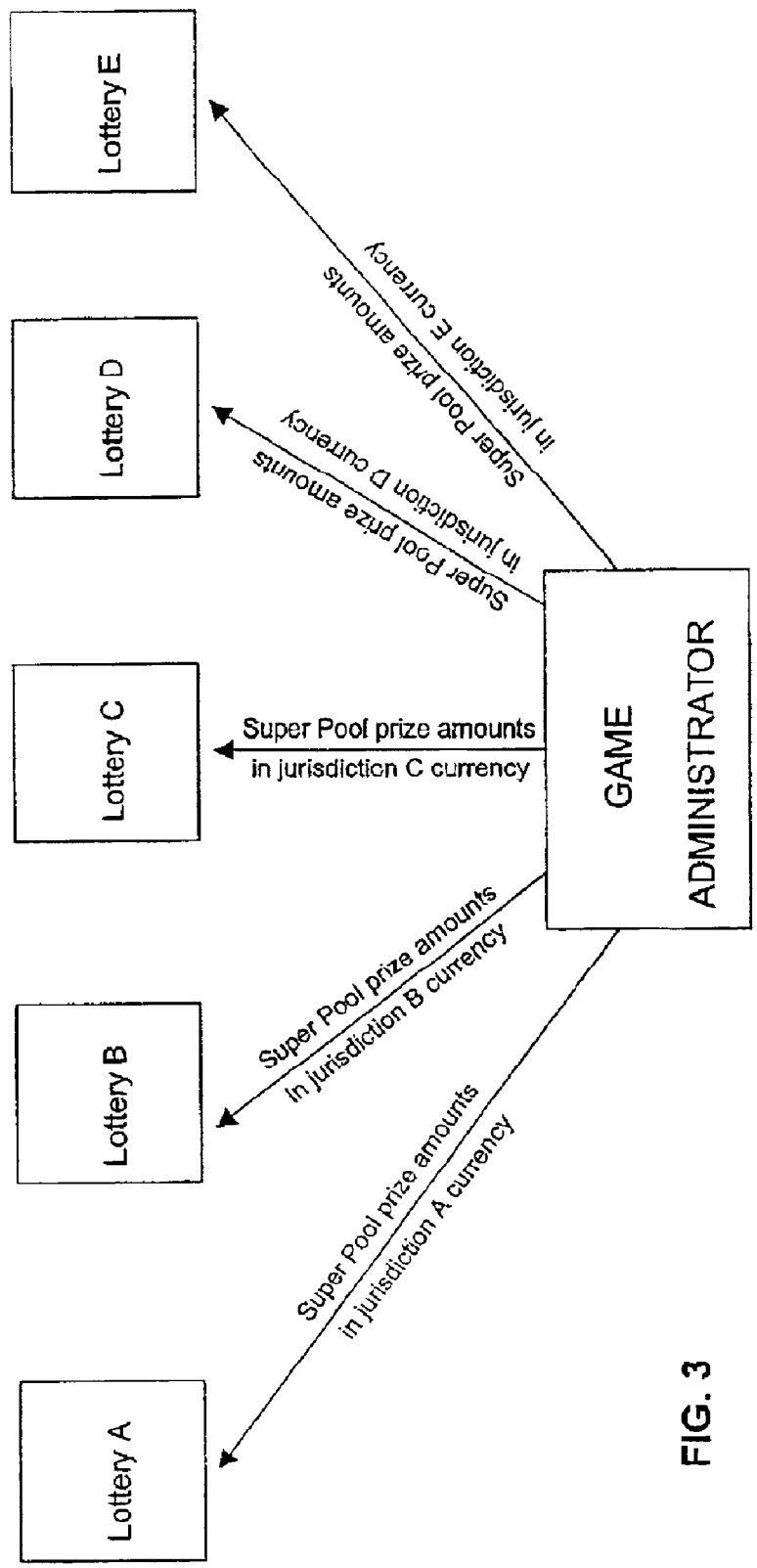
FIG. 3 is a diagram of the reporting by the game administrator to each of the jurisdictions of the authorized payouts in each jurisdiction.
Figure 4:
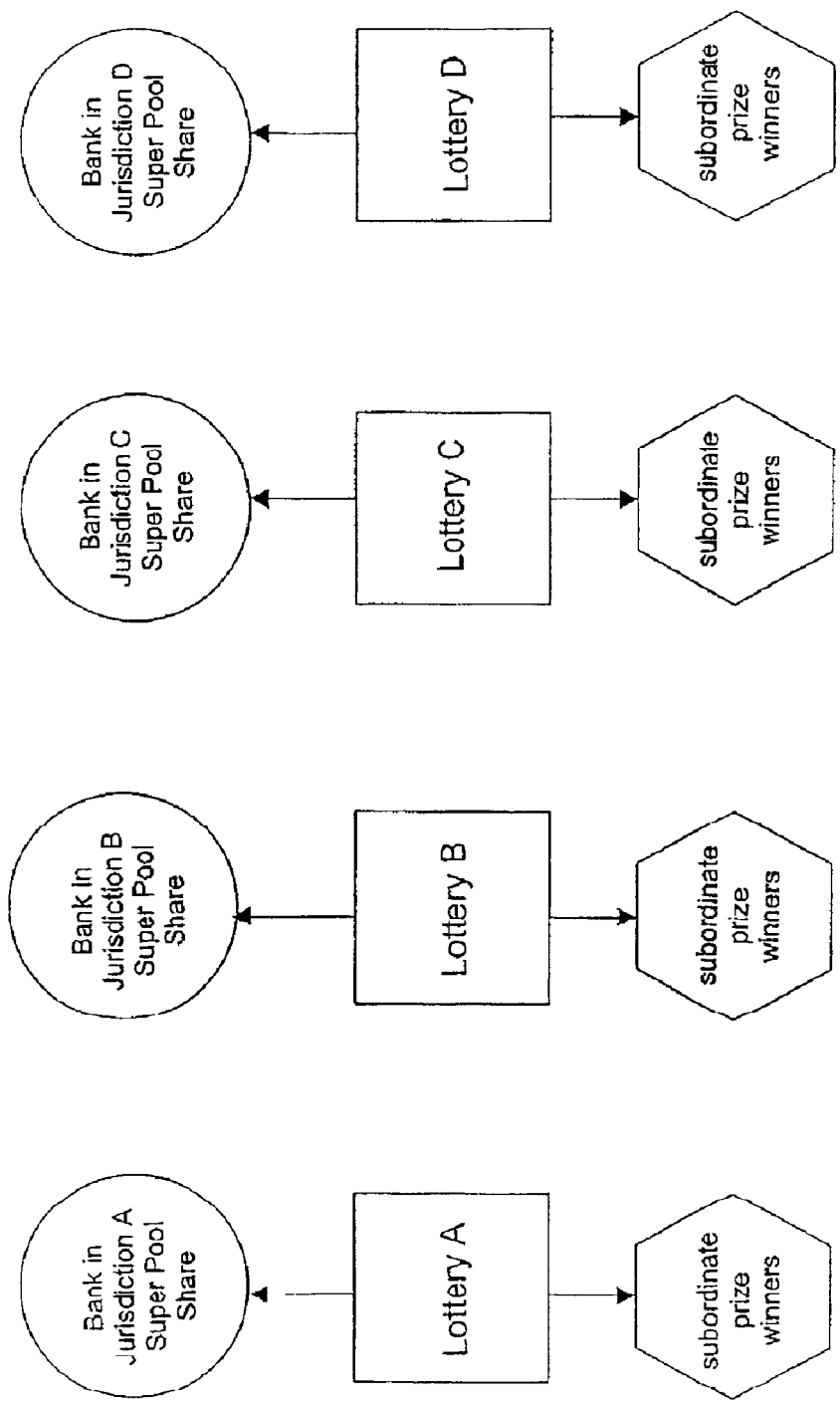
FIG. 4 is a diagram of the payments to subordinate prize winners and to the Super Pool find in four jurisdictions if there was no jackpot prize winner.

With reference to FIG. 1, upon the close of ticket sales prior to a drawing, each lottery jurisdiction (i.e., Lottery A–E) reports to the game administrator its total sales for that drawing in its own currency and the number of chances for the jackpot that are sold. That currency is converted to a reference currency. Totals are made in the reference currency from all jurisdictions and allocated to the various prize levels in the common game. After the drawing, each lottery jurisdiction reports to the game administrator the number of winners at each prize level (FIG. 2), and a determination is made of whether or not the grand prize jackpot has been won. Each lottery is notified if there is a jackpot and thus a Super Pool winner for that drawing (FIG. 3). If no jackpot prize is won all subordinate prize winners in each jurisdiction or country receive payment as per the rules of each respective lottery. The funds allocated to the jackpot prize are not awarded because there is no winner, and are held in trust or in escrow after being converted to the reference currency to form the Super Pool (FIG. 4). Note that it is anticipated that one or more financial institutions in each country will receive money from ticket sales in that jurisdiction or country and payout or retain money, according to the game rules.

As subsequent drawings progress, the jackpot pool continues to increase until there is a jackpot winner in one of the jurisdictions. Each jurisdiction according to its game rules is allowed to set a jackpot ceiling.

When a jackpot win occurs, another mechanism comes into play. Of course, there is the possibility of having more than one jackpot winner. The amount in the Super Pool in the reference currency at the time of the drawing is divided by the number of lotteries selling jackpot winners and distributed to the jurisdictions where the jackpot winning tickets were sold in equal shares. The amounts in the reference currency are reported to all participating jurisdictions. Each jurisdiction that does not have a jackpot winner pays the prizes for each prize level in the local currency as normal.

Figure 5:
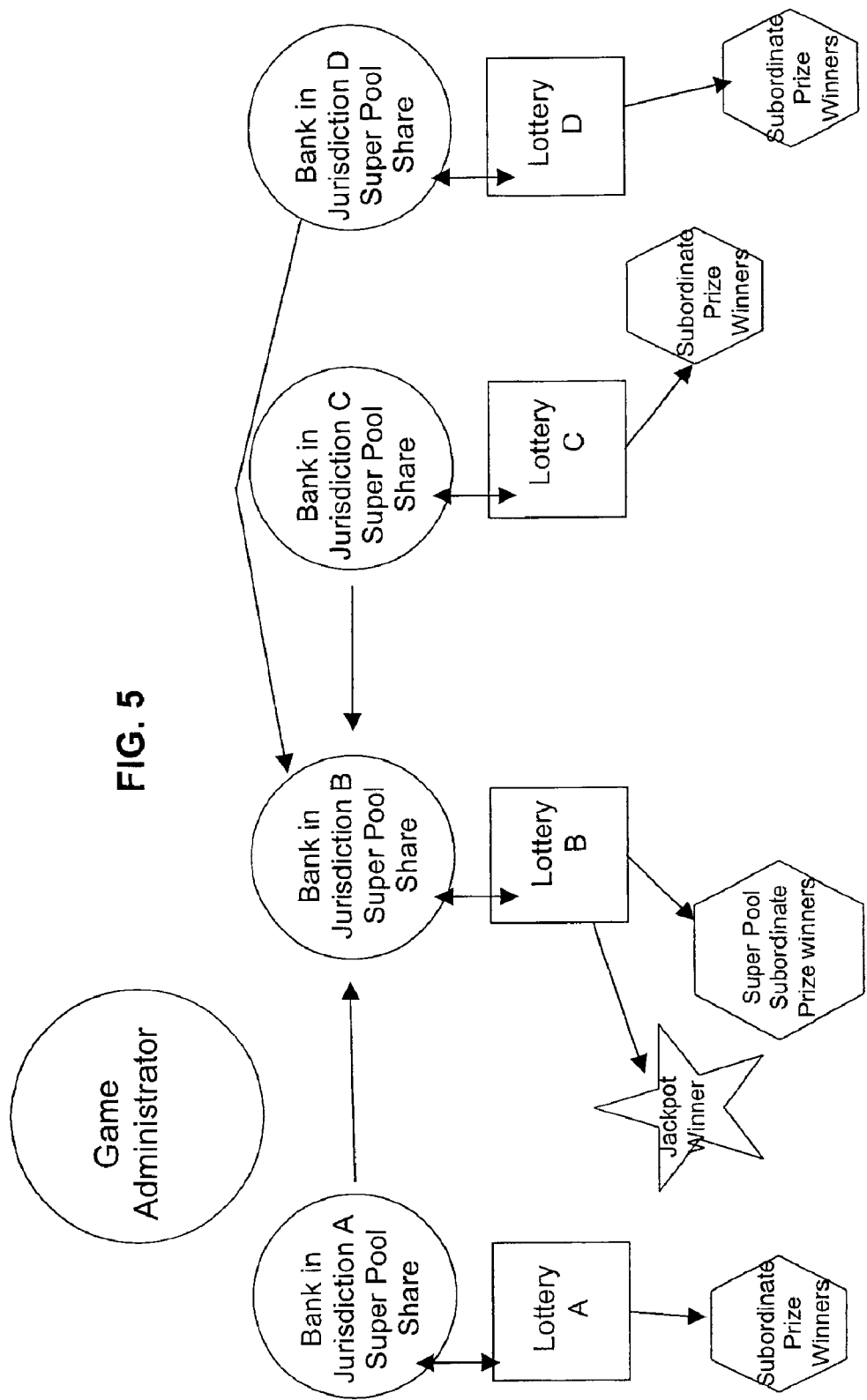
FIG. 5 is a diagram of the flow of monies if the drawing resulted in a single jackpot winner in Jurisdiction B.

However, the jurisdictions that have one or more jackpot winners follow a different procedure. Each jackpot winner is paid in local currency up to the jackpot ceiling as determined by the rules for that particular jurisdiction. Any share of the Super Pool remaining after the jackpot winning amounts are determined is used to supplement all subordinate prizes for that jurisdiction according to rules for that jurisdiction. The prizes are paid in local currency utilizing the official exchange rate at the time the prizes are paid. FIG. 5 illustrates the process where there is a single jackpot winner in Jurisdiction B.

The jurisdictions that have lower jackpot ceilings will have inflated, possibly greatly, their subordinate prizes for drawings when a jackpot winning ticket was purchased in their jurisdiction. Jurisdictions that have no jackpot ceiling forego the gain in subordinate prizes but capitalize on sales related to a high jackpot.

Table 2 is a prize structure for a hypothetical lotto game similar to the Powerball® lottery game but with two numbers drawn from the second bin instead of one. The matrix is a 5/60+1/2/40, which is a combination of a lotto game wherein 5 numbers out of 60 are chosen and a game, in the nature of what is sometimes in the industry called a keno game, in which the player may choose either 1 or 2 numbers out of 40. Given a sellout of the game where each chance purchased is unique, the prizes paid are illustrated according to rules where the percentage of sales allocated to that prize is specified in the right hand column.

TABLE 2

Prize Structure #2
International Game
5/60 + 1/2/40; One Play for $2

|  | Odds | Number of Winners | Prize Levels Cash | Prize Cost | Prize % Of Sales |
|---|---|---|---|---|---|
| Match 5 + 1 | 109,230,240.00 | 1.00 | $65,817,661 | $65,817,661 | 30.1279% |
| Match 5 | 5,748,960.00 | 19.00 | 250,000 | 4,750,000 | 2.1743% |
| Match 4 + 1 | 397,200.87 | 275.00 | 5,000 | 1,375,000 | 0.6294% |
| Match 4 | 20,905.31 | 5,225.00 | 1,000 | 5,225,000 | 2.3917% |
| Match 3 + 1 | 7,355.57 | 14,850.00 | 40 | 594,000 | 0.2719% |
| Match 3 | 387.14 | 282,150.00 | 10 | 2,821,500 | 1.2915% |
| Match 2 + 1 | 416.35 | 262,350.00 | 7 | 1,836,450 | 0.8406% |
| Match 2 | 21.91 | 4,984,650.00 |  | — | 0.0000% |
| Match 1 + 1 | 64.05 | 1,705,275.00 | 5 | 8,526,375 | 3.9029% |
| Match 1 | 3.37 | 32,400,225.00 |  | — | 0.0000% |
| Match 0 + 1 | 31.40 | 3,478,761.00 | 4 | 13,915,044 | 6.3696% |
| Match 0 | 1.65 | 66,096,459.00 | — | — | 0.0000% |
| Totals | 1.00 | 109,230,240.00 | Total Prize Cost: | $104,861,030 | 48.0000% |
|  |  |  | Prize Reserve | $4,369,210 | 2.0000% |
| Overall Odds: | 19.00 | 5,748,906.00 | Return to Lottery: | $109,230,240 | 50.0000% |

Table 3 is a spreadsheet from a 10-year simulation of one drawing per week that illustrates the impact on the subordinate prizes for jackpot winning hypothetical jurisdictions with jackpot ceilings of $2 million, $20 million, $50 million, and $100 million. The reference currency is United States dollars.

TABLE 3

(5/60 + 1/2/40)
International Game Simulation

| Jurisdiction | Maximum Grand Prize (in U.S. dollars) | Number of Grand Prize Winners in Ten Year Period | Number of times Super Pool exceeds Ceiling Prize in Ten Year Period | Excess Super Pool | Match 5 prize OR |
|---|---|---|---|---|---|
| Country A | $20,000,000 | 11.00 | 10.00 |  |  |
| Average |  |  |  | $48,107.089.23 | $35,885,765.16 |
| Maximum |  |  |  | $82,119,884.96 | $62,077,170.51 |
| Country B | $20,000,000 | 36.00 | 24.00 |  |  |
| Average |  |  |  | $70,771,701.95 | $21,978,637.52 |
| Maximum |  |  |  | $165,009,760.70 | $43,713,696.71 |
| Country C | $20,000,000 | 46.00 | 35.00 |  |  |
| Average |  |  |  | $77,312,463.72 | $15,209,804.32 |
| Maximum |  |  |  | $295,245,020.34 | $29,084,856.00 |
| Country D | $100,000,000 | 43.00 | 14.00 |  |  |
| Average |  |  |  | $80,726,271.92 | $7,168,883.28 |
| Maximum |  |  |  | $215,245,626.34 | $13,661,922.94 |
| Country E | $2,000,000 | 19.00 | 19.00 |  |  |
| Average |  |  |  | $75,118,160.23 | $68,279,721.71 |
| Maximum |  |  |  | $156,622,813.17 | $95,026,800.10 |
| Country F | $50,000,000 | 4.00 | 4.00 |  |  |
| Average |  |  |  | $55,614,838.47 | $104,143,494.70 |
| Maximum |  |  |  | $135,009,760.70 | $292,398,638.92 |
| Totals |  | 159.00 |  |  |  |

TABLE 3-continued (5/60 + 1/2/40)
International Game Simulation

| | | | | | | | |
|---|---|---|---|---|---|---|---|
| Per Year Average | | | 15.90 | | | | |
| Average Non-ceiling Grand Prize Awarded | | | $80,316,075.74 | | | | |
| Maximum Non-ceiling Grand Prize Awarded | | | $315,245,626.34 | | | | |
| | Annual Sales in U.S. Dollars | Annual Per Capita Sales in U.S. Dollars | | | | | |
| Country A | $433,475,809.50 | $114.15 | | | | | |
| Country B | $1,070,171,327.80 | $42.81 | | | | | |
| Country C | $326,323,300.53 | $40.13 | | | | | |
| Country D | $1,074,998,304.36 | $53.75 | | | | | |
| Country E | $130,847,526.63 | $18.69 | | | | | |
| Country F | $39,721,570.58 | $0.39 | | | | | |
| $250,000 Match 5 | $5,000 Match 4 + 1 | $1,000 Match 4 | $40 Match 3 + 1 | $10 Match 3 | $7 Match 2 + 1 | $5 Match 1 + 1 | $4 Match 0 + 1 |
| $4,585,432.34 | $91,708.65 | $18,341.73 | $733.07 | $183.42 | $126.39 | $91.71 | $73.37 |
| $7,771,867.80 | $155,437.36 | $31,087.47 | $1,243.50 | $310.87 | $217.61 | $155.44 | $124.35 |
| $2,893,496.98 | $67,869.94 | $11,573.99 | $462.96 | $115.74 | $81.02 | $57.87 | $46.30 |
| $5,537,775.23 | $110,755.50 | $22,151.10 | $886.04 | $221.51 | $155.06 | $110.76 | $88.60 |
| $2,070,003.56 | $41,400.07 | $8,280.01 | $331.20 | $82.80 | $57.96 | $41.40 | $33.12 |
| $3,831,032.31 | $76,620.65 | $15,324.13 | $612.97 | $153.24 | $107.27 | $76.62 | $61.30 |
| $1,091,721.69 | $21,834.43 | $4,366.89 | $174.68 | $43.67 | $30.57 | $21.83 | $17.47 |
| $1,881,668.95 | $37,633.78 | $7,526.76 | $301.07 | $75.27 | $52.69 | $37.63 | $30.11 |
| $8,526,467.59 | $170,529.35 | $34,105.87 | $1,364.23 | $341.06 | $238.74 | $170.53 | $136.42 |
| $11,780,506.00 | $235,610.12 | $47,122.02 | $1,884.68 | $471.22 | $329.85 | $235.61 | $188.49 |
| $12,889,680.26 | $257,792.79 | $51,558.66 | $2,062.34 | $515.59 | $360.91 | $257.79 | $206.23 |
| $35,792,881.65 | $715,853.63 | $143,170.73 | $5,726.83 | $1,431.71 | $1,002.20 | $715.85 | $572.68 |

Tables 4 and 5 are similar displays for a 3/40+3/40 matrix.

TABLE 4

Prize Structure #1
International Game
3/40 + 3/40; One Play for $2

| | Odds | Number of Winners | Prize Levels Cash | Prize Cost | Prize % Of Sales |
|---|---|---|---|---|---|
| Match 3 + 3 | 97,614,400.000000 | 1 | $47,458,344 | $47,458,344 | 24.3091% |
| Match 3 + 2 | 879,409.009009 | 111 | 40,000 | 4,440,000 | 2.2743% |
| Match 2 + 3 | 879,409.009009 | 111 | 40,000 | 4,440,000 | 2.2743% |
| Match 3 + 1 | 48,856.056056 | 1,998 | 2,000 | 3,996,000 | 2.0468% |
| Match 1 + 3 | 48,856.056056 | 1,998 | 2,000 | 3,996,000 | 2.0468% |
| Match 2 + 2 | 7,922.603685 | 12,321 | 600 | 7,392,600 | 3.7866% |
| Match 3 + 0 | 12,562.985843 | 7,770 | 400 | 3,108,000 | 1.5920% |
| Match 0 + 3 | 12,562.985843 | 7,770 | 400 | 3,108,000 | 1.5920% |
| Match 2 + 1 | 440.144649 | 221,778 | 20 | 4,435,560 | 2.2720% |
| Match 1 + 2 | 440.144649 | 221,778 | 20 | 4,435,560 | 2.2720% |
| Match 2 + 0 | 113.180053 | 862,470 | 4 | 3,449,880 | 1.7671% |
| Match 0 + 2 | 113.180053 | 862,470 | 4 | 3,449,880 | 1.7671% |
| Match 1 + 1 | 24.452481 | 3,992,004 | | 0 | 0.0000% |
| Match 1 + 0 | 6.287781 | 15,524,460 | | 0 | 0.0000% |
| Match 0 + 1 | 6.287781 | 15,524,460 | | 0 | 0.0000% |
| Match 0 + 0 | 1.616858 | 60,372,900 | | 0 | 0.0000% |
| Totals | 1.000000 | 97,614,400 | Total Prize Cost: | $93,709,824 | 48.0000% |
| | | | Prize Reserve | $3,904,576 | 2.0000% |
| Overall Odds: | 44.358568 | 2,200,576 | Return to Lottery: | $97,614,400 | 50.0000% |

TABLE 5

(3/40 + 3/40)
International Game Simulation

| Jurisdiction | Maximum Grand Prize (in U.S. dollars) | Number of Grand Prize Winners in Ten Year Period | Number of times Super Pool exceeds Ceiling Prize In Ten Year Period | Excess Super Pool | 3 + 2 and 2 + 3 prize |
|---|---|---|---|---|---|
| Country A | $20,000,000 | 16.00 | 9.00 | | |
| Average | | | | $41,745,822.17 | $2,257,476.71 |
| Maximum | | | | $122,012,136.98 | $4,959,654.57 |
| Country B | $10,000,000 | 46.00 | 40.00 | | |
| Average | | | | $34,553,578.23 | $1,242,251.41 |
| Maximum | | | | $132,012,136.98 | $2,699,515.44 |
| Country C | $20,000,000 | 39.00 | 24.00 | | |
| Average | | | | $34,513,962.63 | $802,576.49 |
| Maximum | | | | $122,012,136.98 | $1,634,910.47 |
| Country D | $100,000,000 | 31.00 | 6.00 | | |
| Average | | | | $37,747,320.39 | $386,245.09 |
| Maximum | | | | $42,012,136.98 | $434,910.50 |
| Country E | $2,000,000 | 15.00 | 15.00 | | |
| Average | | | | $40,804,212.15 | $3,549,766.76 |
| Maximum | | | | $79,455,911.74 | $6,028,095.20 |
| Country F | $50,000,000 | 3.00 | 3.00 | | |
| Average | | | | $32,700,855.29 | $5,113,751.40 |
| Maximum | | | | $66,423,237.42 | $7,849,151.79 |
| Totals | | 150.00 | | | |
| Per Year Average | | 15.00 | | | |
| Average Non-ceiling Grand Prize Awarded | | $45,204,001.84 | | | |
| Maximum Non-celling Grand Prize Awarded | | $142,012,136.98 | | | |

| | Annual Sales in U.S. Dollars | Annual Per Capita Sales In U.S. Dollars |
|---|---|---|
| Country A | $428,878,722.10 | $112.42 |
| Country B | $809,789,639.57 | $32.39 |
| Country C | $323,764,073.51 | $39.82 |
| Country D | $1,011,984,140.31 | $50.60 |
| Country E | $129,821,340.25 | $18.55 |

| $40,000 OR Match 3 + 2 | $40,000 Match 2 + 3 | $2,000 Match 3 + 1 | $2,000 Match 1 + 3 | $600 Match 2 + 2 | $400 Match 3 + 0 | $400 Match 0 + 3 |
|---|---|---|---|---|---|---|
| $465,741.91 | $465,741.91 | $23,287.10 | $23,287.10 | $6,986.13 | $4,657.42 | $4,657.42 |
| $984,543.45 | $984,543.45 | $49,227.17 | $49,227.17 | $14,768.15 | $9,845.43 | $9,845.43 |
| $279,824.88 | $270,824.88 | $13,541.24 | $13,541.24 | $4,062.37 | $2,708.25 | $2,708.25 |
| $580,610.63 | $560,610.63 | $27,630.53 | $27,530.53 | $8,259.15 | $5,506.11 | $5,506.11 |
| $186,410.00 | $186,410.00 | $9,320.50 | $9,320.50 | $2,796.15 | $1,884.10 | $1,864.10 |
| $346,213.01 | $346,213.01 | $17,310.65 | $17,310.65 | $5,193.20 | $3,462.13 | $3,462.13 |
| $106,476.93 | $106,476.93 | $5,323.85 | $5,323.85 | $1,597.15 | $1,064.77 | $1,064.77 |
| $115,820.39 | $115,820.39 | $5,791.02 | $5,791.02 | $1,737.31 | $1,158.20 | $1,158.20 |
| $713,853.65 | $713,853.65 | $35,692.88 | $35,692.68 | $10,707.80 | $7,138.54 | $7,138.54 |
| $1,189,677.49 | $1,189,677.49 | $59,483.87 | $59,493.87 | $17,845.16 | $11,898.77 | $11,896.77 |
| $1,014,129.10 | $1,014,129.10 | $50,706.45 | $50,706.45 | $15,211.94 | $10,141.29 | $10,141.29 |
| $1,539,309.17 | $1.539,309.17 | $76,965.46 | $76,965.46 | $23,089.54 | $15,393.09 | $15,393.09 |

| $20 Match 2 + 1 | $20 Match 1 + 2 | $4 Match 2 + 0 | $4 Match 0 + 2 |
|---|---|---|---|
| $232.87 | $232.87 | $46.57 | $46.57 |
| $492.27 | $492.27 | $98.45 | $98.45 |
| $135.41 | $135.41 | $27.08 | $27.08 |
| $275.31 | $275.31 | $55.06 | $55.06 |
| $93.21 | $93.21 | $19.97 | $19.97 |
| $173.11 | $173.11 | $34.62 | $34.62 |
| $53.24 | $53.24 | $10.65 | $10.65 |
| $57.91 | $57.91 | $11.58 | $11.68 |
| $356.93 | $356.93 | $71.39 | $71.39 |
| $594.84 | $594.84 | $118.97 | $118.97 |
| $507.06 | $507.06 | $101.41 | $101.41 |
| $769.65 | $769.65 | $153.93 | $153.93 |

Currency fluctuations may affect both price point of the ticket and the amount to be paid in prizes. The price point may be affected because the tickets are sold across jurisdictions that have different currencies and the relative values of those currencies change from time to time. In a lottery game, it is important that each chance sold have the same price so as not to reward unfairly players who might buy chances that would have effective discounts. In other words, if a customer buys a chance for $1, it would be unfair to sell a similar chance to someone else for 10 cents.

To handle this issue, each lottery deposits with the Super Pool the same amount in a single currency for each chance sold. For example, regardless of the price in, say, pesos, shillings, or kroner, 30 cents US would be deposited for each chance sold. The Super Pool is the only instrument of the game that is a collective asset, so it is important that the price of a chance to win the Super Pool be uniform among participants.

The values of various currencies may move up and down relative to each other and have an impact on the value of subordinate prizes paid in a local currency, but not on the common value of the Super Pool. Extraordinary currency revaluations may require a price change periodically in a jurisdiction so that subordinate prizes can be paid and profits realized, but the contribution to the Super Pool is unaffected. There is a risk that the reference currency (e.g. the US dollar) might move up and down but the players assume the risk just like they assume the risk for interest rates moving up and down for a lotto game where the prizes are paid in annuities.

The impact and perception of currency fluctuations is also managed by paying subordinate prizes on a pari-mutuel basis. Since these prizes vary from drawing to drawing based on the number of winners at each prize level, they will be different for each drawing. Adjustments are made up or down to the subordinate prizes for currency fluctuations to insure that a constant contribution for each Super Pool portion of the ticket is made in the reference currency.

Therefore the price of tickets can also vary from jurisdiction to jurisdiction to achieve different percentage paybacks to players. All differences among jurisdictions in this regard are made by adjusting the number of categories of subordinate prizes and the proportions of non-Super Pool prize money allocated to each subordinate prize level.

The amount of money available in the Super Pool also depends on relative currency values at some point in time. It is possible for money to be collected over a period of weeks as no jackpot winners are drawn and therefore no awards of the Super Pool are made. Currencies can change measurably during this time frame. Choosing the most stable reference currency can ameliorate this affect. By making deposits to the Super Pool in the reference currency, it is always possible to determine the value in local currency once a jackpot winner is sold.

It is important, also, that the size of the Super Pool to be paid not be determined at the time a ticket is sold, or at the time money is deposited in a Super Pool escrow account. The size of the pool can be estimated at any time, but the size of the pool and therefore the size of the prizes resulting from the Super Pool, is determined at the time that winning tickets require Super Pool awards to be paid to players. Immediately following a drawing in which at least one jackpot winner has been determined, the Super Pool is divided equally among jurisdictions according to how many jackpot winning tickets were sold by that jurisdiction. It is then converted back to local currencies and each jurisdiction can announce the size of its jackpot prizes and the size of its subordinate prizes.

The risk of currency fluctuations is here again borne by the players. Should a currency collapse during draw 3 in a run that requires 5 drawings before a jackpot is won, the size of the jackpot is determined by the money on deposit in the reference currency after the collapse at the time of the win. Likewise, for the non jackpot portions of the Super Pool. Of course, the opposite of a collapse could occur. In this case the currency risk borne by the players results in their additional reward.

There also can be fluctuations in currencies after a drawing has been won and before a prize is collected. It is not uncommon for a player to wait months before coming forward with a winning ticket to claim a prize. Since the amount of all prizes is determined in local currency after each drawing, the lotteries bear no currency risk in this regard. Funds are on deposit with the local jurisdiction for paying the prize. The value of this money could go either up or dawn relative to other currencies because of a delay in claim a prize. The player bears this risk also.

The rolldown occurs only when there is a jackpot winner in a particular jurisdiction and the rolldown is in effect only for jackpot winning jurisdictions. Accordingly, a new and unique lottery dynamic is expected to take place. Whereas most players buy tickets in anticipation of winning the jackpot prize, those same players care little about who wins a jackpot prize if it is not themselves. However, with this game dynamic, each player from a jurisdiction with a jackpot ceiling has a vested interest in a jackpot winner coming from their jurisdiction even if they do not win the jackpot because they also stand to benefit personally. The dynamic would have little benefit for a game that is not multi-jurisdictional. Because of limitations on population bases in most countries, the game is of optimal benefit when it is played across international borders. The specter of currency differences and fluctuating exchange rates are dealt with effectively, and the cultural or legal differences among countries that created jackpot limitations is used to advantage instead of disadvantage in a flexible manner so as to accommodate any jackpot limitation.

For a given size jackpot and jackpot ceiling, the size of the individual subordinate prizes paid from the Super Pool will be a function of the number of subordinate prize winners. Smaller jurisdictions will arguably have fewer winners to split the Super Pool and will have the largest prize inflation.

The foregoing descriptions comprise illustrative embodiments of the present inventions. The foregoing embodiments and the methods described herein may vary based on the ability, experience, and preference of those skilled in the art. Merely listing the steps of the method in a certain order does not necessarily constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

I claim:

1. In a lottery game to be played among a plurality of groups, the lottery game requiring payment of an entry fee by a player and a method of paying prizes, the prizes consisting of a jackpot and first and second subordinate prizes, the method comprising the steps of:

accumulating an individual group prize pool for each group participating in the lottery game from a first portion of the entry fee;

accumulating a super prize pool from a second portion of the entry fee;

paying the first subordinate prizes from individual group prize pools;

paying the jackpot and the second subordinate prizes from the super prize pool in one or more groups having a jackpot winner; and creating a jackpot prize limit in one or more of the groups such that money in the super prize pool in excess of the jackpot prize limit is awarded as second subordinate prizes.

2. The method of claim 1, further comprising the steps of:

adding the second subordinate prizes to the first subordinate prizes in the one or more groups having a jackpot winner.

3. The method of claim 1, wherein the jackpot prize is subject to a maximum limit that is different in one group from at least one other group.

4. The method of claim 1, wherein each group is a jurisdiction.

5. The method of claim 4, wherein the step of accumulating the super prize pool further comprises the steps of:

accumulating funds from a first jurisdiction in the currency of the first jurisdiction into a first individual pool;

accumulating funds from a second jurisdiction in the currency of the second jurisdiction into a second individual pool, said currency different from the currency accumulated in the first individual pool;

converting the funds from each individual pool into a reference currency; and allocating a fixed amount in the reference currency per entry fee from each individual pool to the super prize pool.

6. The method of claim 5, wherein the currency of one jurisdiction fluctuates relative to the currency of at least one other jurisdiction.

7. The method of claim 1, wherein the step of accumulating the super prize pool further comprises the steps of:

setting the amount of the entry fee in each group, wherein the entry fee of one group is different from the entry fee of at least one other group;

accumulating the super prize pool from a first portion of each entry fee, wherein the percentage of each entry fee accumulated in the super prize pool is the same for each group; and accumulating individual pools for each group from the remainder of the entry fee associated with that group.

8. The method of claim 7, wherein each group is a jurisdiction, and the currency of one jurisdiction is different from the currency of at least one other jurisdiction.

9. The method of claim 8, wherein the currency of one jurisdiction fluctuates relative to the currency of at least one other jurisdiction.

\* \* \* \* \*